Patented May 7, 1929.

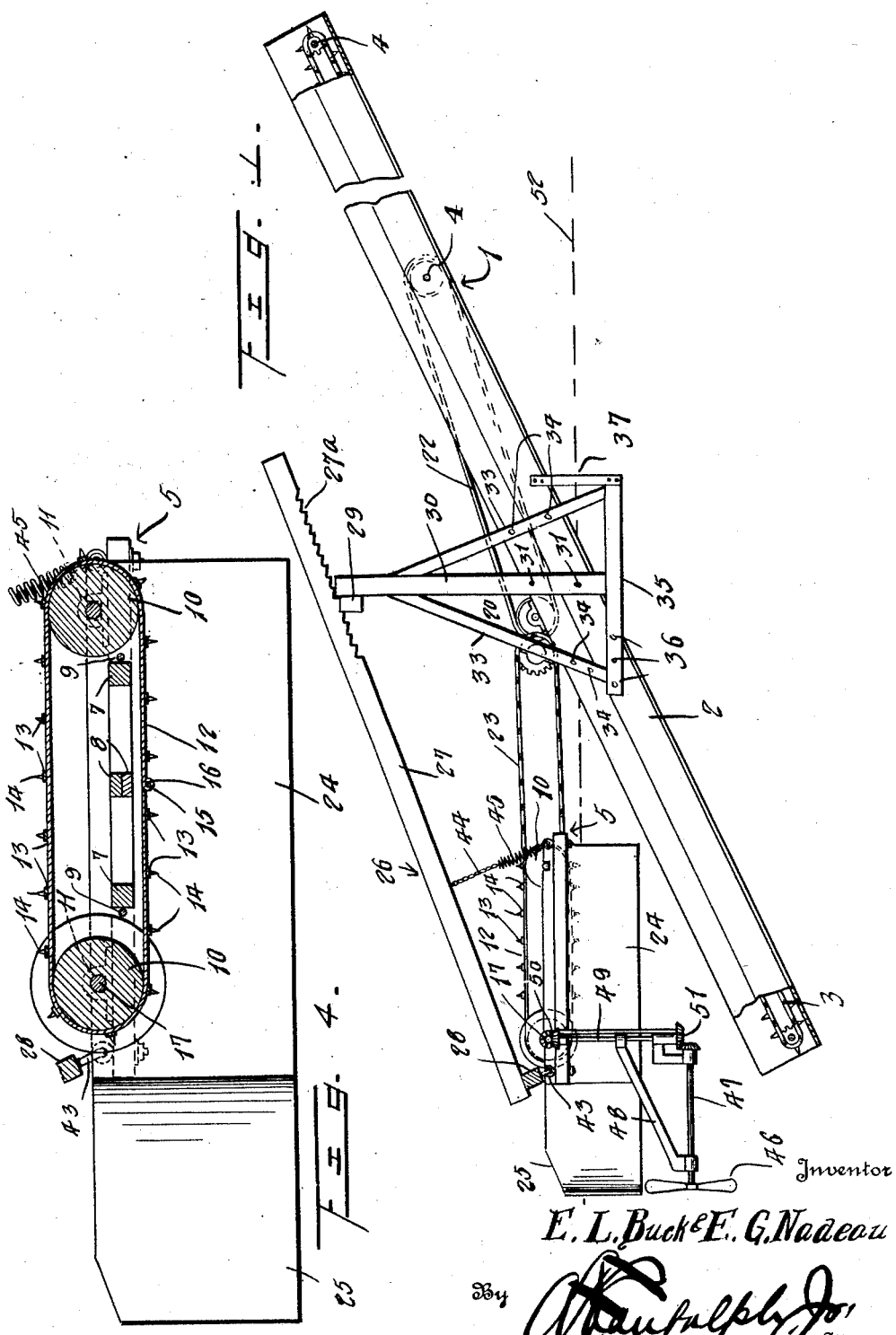

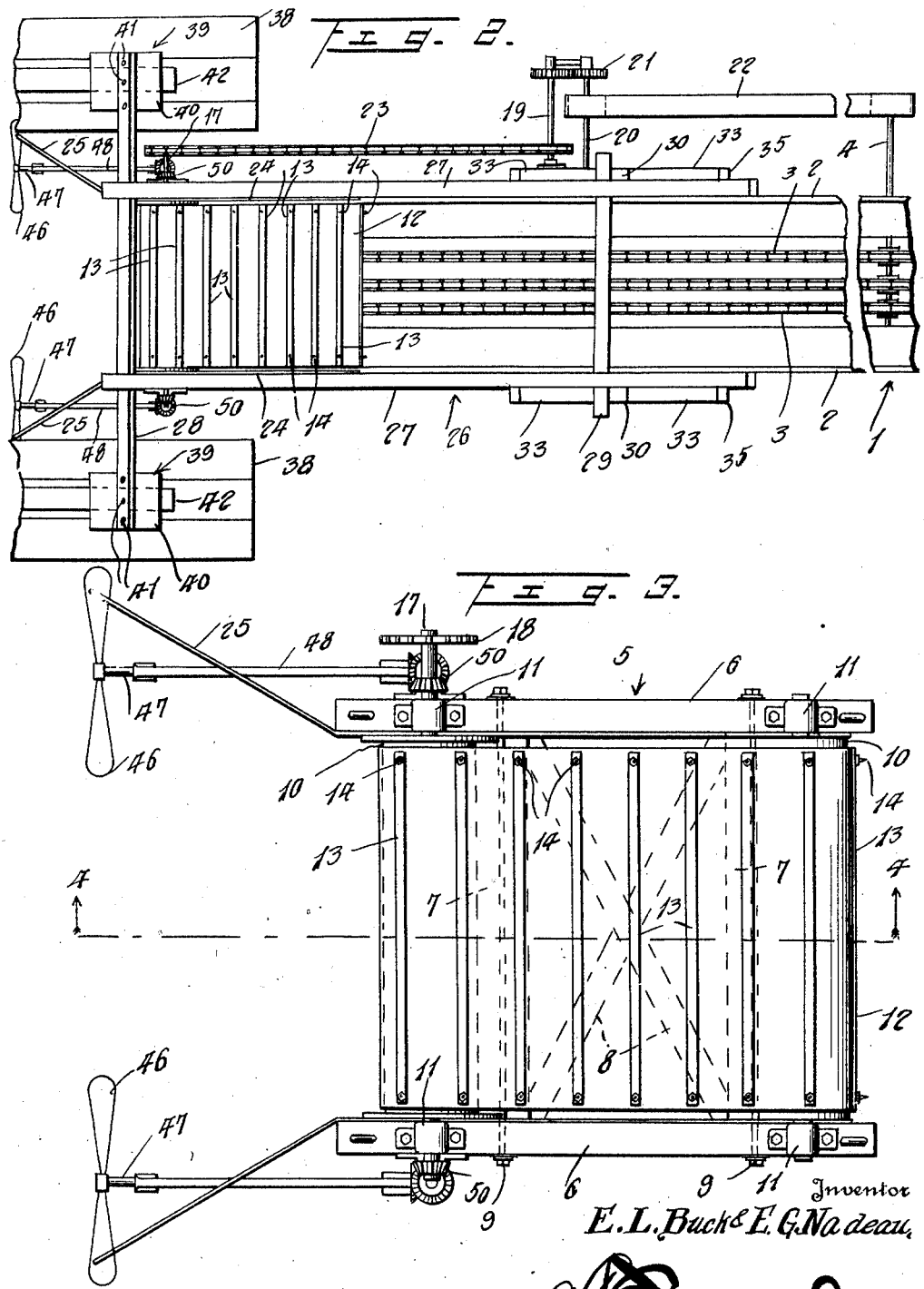

1,712,329

UNITED STATES PATENT OFFICE.

EDWARD LESLIE BUCK AND EDMUND GEORGE NADEAU, OF HOWLAND, MAINE.

FEED ATTACHMENT FOR CONVEYERS.

Application filed November 3, 1927. Serial No. 230,769.

This invention relates to improvements in the feed attachment for conveyers which constitutes the subject matter of my U. S. Letters Patent 1,505,928 granted August 19th, 1924, and which comprises means for advancing logs into a conveyer adapted to elevate the logs from a river, stream, or the like, and means for supporting the advancing means from and above the receiving end of the conveyer.

The present invention has for one of its objects to simplify and improve the general construction of the advancing means, and to attain this end it comprehends the provision of means of this character which shall include a novel frame, drums journaled upon the frame, and an endless rubber belt supported by the drums and provided with slats having spurs.

The present invention has for a further object to improve the supporting means to the end that the advancing means may quickly adjust itself to accommodate logs of different thicknesses, and to the end that the tension under which it holds the logs in contact with the conveyer may be easily adjusted.

The present invention has for a still further object to provide a feed attachment with means which shall be adapted to drift the logs to the conveyer and to effect the washing of the logs.

With the foregoing and other objects in view, the nature of which will appear as the description proceeds, the invention consists in the construction, combination, and arrangement of parts, hereinafter fully described and claimed, and illustrated in the accompanying drawings, wherein:

Figure 1 is a view partly in elevation and partly in vertical section of a conveyer equipped with the feed attachment.

Figure 2 is a top plan view of the conveyer and feed attachment.

Figure 3 is a detail top plan view on an enlarged scale of the feed attachment, and Figure 4 is a sectional view taken on the vertical plane indicated by the line 4—4 of Figure 3.

Referring in detail to the drawings, 1 designates a conveyer of the type usually employed for the purpose of elevating logs and the like from rivers, streams, and the like, the logs or the like being floated from the point or points where they are cut to the point where they are to be delivered onto the shore by the conveyer. The conveyer 1 is supported in an inclined position with its lower or receiving end dipping into the water, and it comprises a trough 2 and endless chains 3 provided with spurs and driving a power take off shaft 4.

The feed attachment comprises means for advancing the logs or the like into the receiving end of the conveyer 1. This means is supported above the receiving end of the conveyer 1, and it comprises a frame 5 which consists of side bars 6, cross bars 7, and brace bars 8. The cross bars 7 are located inwardly beyond the ends of the side bars 6, and the brace bars 8 are arranged in crossed relation between and contact at their ends with the side and cross bars. The frame bars 6, 7, and 8 are held in assembled relation by bolts 9. Drums 10 are rotatably supported on the frame 5 by bearings 11. A belt 12 is mounted upon the drums 10 and it is provided with slats 13 having spurs 14. The belt 12 is made from rubber, and the adjacent ends thereof are connected by lacing 15 and a pin 16. The means for connecting the ends of the belt 12 permit any slack occurring in the belt to be readily taken up. The shaft 17 of the rear drums 10 extends laterally beyond the frame 5, and the extended end thereof is provided with a sprocket wheel 18. Shafts 19 and 20 are journaled on and extend laterally from a side of the trough 2, and these shafts are connected by pinions 21. A belt 22 extending from the shaft 4 to the shaft 20 drives the latter, and a sprocket chain 23 extending from the sprocket wheel on shaft 19 to the sprocket wheel 18 drives the belt 12. The belt 12 is driven at or near the speed of the conveyer chains 3, and while in motion advances the logs into the receiving end of the conveyer 1 and holds them under such pressure that the spurs of the conveyer chains 3 will firmly engage them. Guards 24 are secured to and depend from the sides of the frame 5. The guards 24 extend rearwardly beyond the frame 5, and their rear end portions are laterally deflected to provide guides 25 which direct the logs to and beneath the belt 12.

The log advancing means is pivotally suspended at its rear end and yieldingly suspended at its front end from supporting means which comprises an inclined frame 26 consisting of side bars 27 and a rear end cross bar 28. The frame 26 rests at its front end upon a cross bar 29 which is carried by the upper ends of standards 30 rising from the sides of the conveyer trough 2. The standards 30 are secured to the sides of the trough 2, as shown at 31, and their connections with the trough are reinforced by braces 33 secured to the sides of the trough, as shown at 34. The lower ends of the braces 33 rest upon horizontal bars 35 secured as at 36 to the sides of the trough 2, and supported from the trough by hangers 37. The rear end of the frame 26 is supported from booms or floats 38 by means of slides 39 which rest upon the booms and are secured to the cross bar 28. The lower edges of the side bars 27 are notched to provide teeth 27ª which engage the cross bar 29. As the frame 26 is slidably supported upon the booms 38, it may be adjusted with respect to the conveyer 1 so as to position the advancing means in proper relation to the chains 3 of the conveyer, the frame 26 being held in its adjusted position by the engagement of the teeth 27ª with the cross bar 29. The slides 39 consist of blocks 40 secured to the cross bar 28, as shown at 41 and shoes 42 secured to the blocks and resting upon the booms 38. The rear end of the frame 5 of the advancing means is pivoted to the frame 26 by eye bolts 43, and the front end of the frame 5 is suspended from the frame 26 by chains 44 and coil springs 45.

The means for floating the logs between the conveyer 2 and the advancing means and for washing the logs, comprises blades 46 which are located below and at the rear ends of the guides 25. The blades 46 are fixed to shafts 47 which are journaled in brackets 48 fixed to and depending from the frame 5 of the advancing means. The shafts 47 are driven from the drum shaft 17 through the medium of shafts 49. The shafts 49 are connected to the shaft 17 by gears 50 and to the shafts 47 by gears 51.

In practice, the lower run of the belt 12 occupies a position in close proximity to the surface 52 of the river, stream or the like and travels in the direction of the conveyer 2, the guards 24 and the guides 25 together with the blades 46 are located below the surface of the river, stream or the like, and these parts are located above the receiving end of the conveyer. The blades 46 are located rearwardly beyond the receiving end of the conveyer 2, and they induce in the river, stream or the like a current which flows between the guards 24 and their guides 25 and in the direction of the conveyer. This current washes the logs, and floats them to and between the belt 12 and conveyer 2, the belt engaging the logs and moving them horizontally and downwardly in the direction of the conveyer so as to effect a firm engagement of the logs by the conveyer chains 3. As the frame is pivotally supported at its rear end, and as the blades 46 are connected to the frame in advance of its pivot, it is under constant urge in a downward and rearward direction against the tension of the springs 25, with the result that the belt 12 will be held firmly in engagement with the logs. Furthermore, this manner of supporting the frame 5 permits it to yield upwardly under the buoyancy of large logs and when the logs contact with the conveyer chains 3 and are being moved upwardly beyond the belt 12.

From the foregoing description taken in connection with the accompanying drawings, the advantages of the construction and of the method of operation of the device will be readily apparent to those skilled in the art to which the same appertains. While we have described the principle of operation of the device, together with the structure which we now consider to be the best embodiment thereof, we desire to have it understood that the structure shown is merely illustrative, and such changes may be made when desired as are within the scope of the invention as claimed.

What is claimed is:—

1. An apparatus of the character set forth comprising, in combination with a conveyer, feeding means arranged above the receiving end of the conveyer, and current generating means carried by the feeding means.

2. An apparatus of the character set forth comprising, in combination with a conveyer, feeding means arranged above the receiving end of the conveyer, means for operating the feeding means from the conveyer, current generating means carried by the feeding means, and means for operating the current generating means from the feeding means.

3. An apparatus of the character set forth comprising, in combination with a conveyer, a bar situated above and extending across the conveyer in advance of the receiving end thereof, floats, a frame arranged above the receiving end of the conveyer and slidably mounted upon the floats and pivotally and adjustably connected to the bar, and feeding means suspended from the frame.

4. An apparatus of the character set forth comprising, in combination with a conveyer, a bar situated above and extending across the conveyer in advance of the receiving end thereof, floats, a frame arranged above the receiving end of the conveyer and slidably mounted upon the floats and pivotally and adjustably connected to the bar, feeding means located between the conveyer and frame, means pivotally connecting the rear end of the feeding means to the frame, and means yieldingly supporting the front end of the feeding means from the frame.

In testimony whereof we affix our signatures.

EDWARD LESLIE BUCK.
EDMUND GEORGE NADEAU.